(12) United States Patent
Chen et al.

(10) Patent No.: US 11,537,503 B2
(45) Date of Patent: Dec. 27, 2022

(54) CODE EDITOR FOR USER INTERFACE COMPONENT TESTING

(71) Applicant: salesforce.com, inc., San Francisco, CA (US)

(72) Inventors: Xiaoyi Chen, Mountain View, CA (US); Billy Ma, San Mateo, CA (US); William Braden Hays, Issaquah, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/778,059

(22) Filed: Jan. 31, 2020

(65) Prior Publication Data

US 2021/0240597 A1    Aug. 5, 2021

(51) Int. Cl.
```
G06F 9/44      (2018.01)
G06F 9/445     (2018.01)
G06F 11/36     (2006.01)
G06F 8/38      (2018.01)
```
(52) U.S. Cl.
CPC ............ *G06F 11/3644* (2013.01); *G06F 8/38* (2013.01); *G06F 11/3636* (2013.01); *G06F 11/3664* (2013.01)

(58) Field of Classification Search
CPC ............ G06F 11/3644; G06F 11/3636; G06F 11/3664; G06F 8/38
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

Microsoft, Use Coded UI test to test your code, 2018, pp. 1-22. https://docs.microsoft.com/en-us/visualstudio/test/use-ui-automation-to-test-your-code?view=vs-2019 (Year: 2018).*

(Continued)

*Primary Examiner* — Mongbao Nguyen
(74) *Attorney, Agent, or Firm* — LKGlobal | Lorenz & Kopf, LLP

(57) ABSTRACT

A system for conducting user interface (UI) software component testing has been developed. The test of the UI software component is initiated and a display of the test results are shown to a user in a browser used in the testing. A code editor used for debugging by the user receives the test results from the browser and presents the test results to the user for debugging. The browser webview and the code editor are simultaneously displayed to the user in a dual screencast window during the UI software testing.

11 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,600,401 B1* | 3/2017 | Haischt ............... G06F 11/3664 |
| 10,339,299 B1* | 7/2019 | Magnuson ............ H04L 9/3239 |
| 10,459,697 B1* | 10/2019 | Metwally .................. G06F 8/72 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0070738 A1* | 3/2009 | Johnson ............... G06F 11/3688 717/124 |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0075792 A1* | 3/2017 | Udvuleanu ......... G06F 11/3664 |
| 2017/0277664 A1* | 9/2017 | Mihalcea ............. G06F 40/146 |
| 2017/0337041 A1* | 11/2017 | Callahan ................... G06F 8/72 |
| 2018/0173390 A1* | 6/2018 | Dunne ................... G06F 9/547 |
| 2019/0227911 A1* | 7/2019 | Raviv ................... G06F 11/364 |
| 2019/0303116 A1* | 10/2019 | Ding ....................... G06F 8/33 |
| 2019/0340103 A1* | 11/2019 | Nelson ................ G06F 11/3636 |

(56) References Cited

U.S. PATENT DOCUMENTS

2020/0133829 A1* 4/2020 Zazo .................. G06F 11/3457
2020/0218514 A1* 7/2020 Wang ........................ G06F 8/34

OTHER PUBLICATIONS

Juraj Kubelka, The Road to Live Programming: Insights From the Practice, 2018, pp. 1090-1099. https://dl.acm.org/doi/pdf/10.1145/3180155.3180200 (Year: 2018).*

Yanchun Sun, Automating Repetitive Tasks on Web-based IDEs via an Editable and Reusable Capture-Replay Technique, 2015, pp. 666-675. https://ieeexplore.ieee.org/stamp/stamp.jsp?tp=&arnumber=7273682 (Year: 2015).*

Kivanc Muslu, Data Debugging with Continuous Testing, 2013, pp. 631-634. https://dl.acm.org/doi/pdf/10.1145/2491411.2494580 (Year: 2013).*

José Campos, GZoltar: An Eclipse Plug-in for Testing and Debugging, 2012, pp. 378-381. https://dl.acm.org/doi/pdf/10.1145/2351676.2351752 (Year: 2012).*

* cited by examiner

CODE EDITOR FOR USER INTERFACE COMPONENT TESTING

TECHNICAL FIELD

Embodiments of the subject matter described herein relate generally to software development. More particularly, embodiments of the subject matter relate to a code editor for user interface component testing.

BACKGROUND

When software developers run or execute user interface (UI) component testing, they often need to switch between code editors and browsers to see the result of a test run or to debug a test. This often distracts the developer and interrupts their work flow. Hence, there is a need to provide inline run/debug actions adjacent to the test code, and present UI Component tests side-by side in a code editor.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

A system and method for conducting user interface (UI) software component testing has been developed. A test of the UI software component is initiated and a display of the test results are shown to a user in a browser used in the testing. A code editor used for debugging by the user receives the test results from the browser and presents the test results to the user for debugging. The browser webview and the code editor are simultaneously displayed to the user in a dual screencast window during the UI software testing.

Figure 1A:
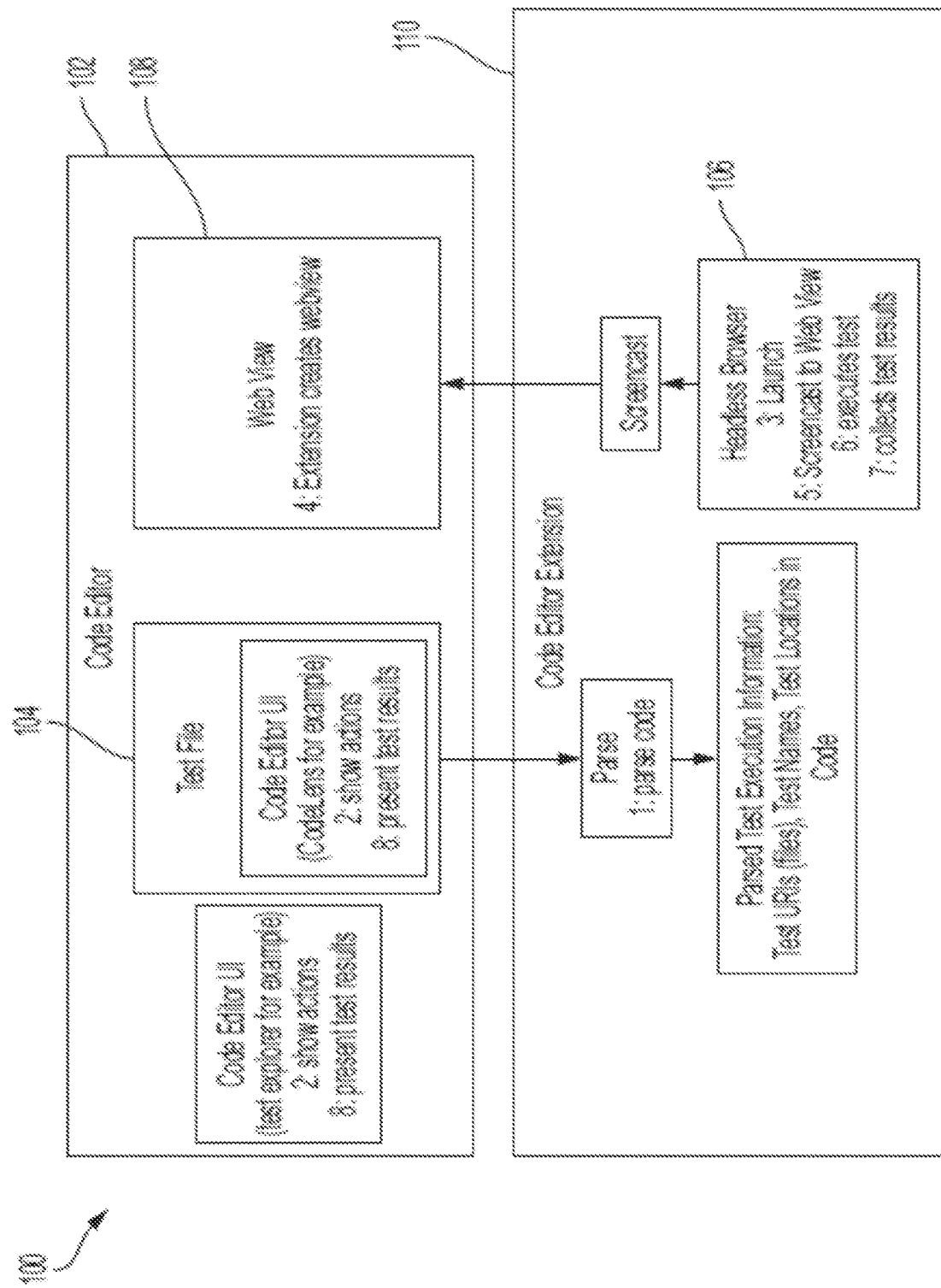
FIG. 1a is a block diagram of a system for conducting user interface (UI) software component testing in accordance with one embodiment.

Turning now to FIG. 1a, a block diagram 100 is shown of a system for conducting UI software component testing in accordance with one embodiment. In this example, the system includes a code editor 102 and a browser 106. The code editor 102 accesses a test file 104 that is to be tested. The code editor user interface (UI) shows the test actions and presents the test results for the test file 104. Examples of a code editor UI may include "Test Explorer" or "CodeLens". The code editor may also be an "inline" code editor and some embodiments. An inline code editor allows a user to edit the code inside the application. In some embodiments, the code editor may utilize an application programming interface (API) for the user. The API may be extensible which means that extensions may be added to provide new functionality or modification of existing functionality in the future without impairing existing system functions.

A code editor extension 110 parses the code of the test file 104 to obtain test execution information including: test uniform resource locator (URL) files; test names; and test locations located within the code of the test file. The browser 106 is then launched with a debugging port. A debugging port is a port included in a device to simplify development and debugging operations. In alternative embodiments, a regular browser with a graphical user interface (GUI) could be used. In other embodiments, the debugging port may be remotely located. Also, the browser may be a "headless" browser. A headless browser is a web browser without a graphical user interface. They are typically executed via a command-line interface or using network communications.

A web view 108 is launched by the code editor 102. The browser 106 then executes the tests of a UI component, collects the test results and uses a screencast to display the testing progress to a user. In some embodiments, a "UI component" is defined as reusable user interface elements of a file. "UI component tests" or automated code that asserts the properties and functions of the UI component. This code could be loaded on a server with URLs used as identifiers. In other embodiments, the screencast display may show the testing actions, and/or the testing results at the "testing breakpoints" of the test file 104. A testing breakpoint is an intentional stopping or pausing place in a program file that is put in place for debugging purposes. During the stop or interruption, the user may inspect the testing results to determine whether the program file is functioning as expected. The user may also inspect variables or evaluate expressions so as to investigate why a test is failing. For example, a user may inspect the UI component states for example values of a particular property or attribute of a component during the interruption at the breakpoint.

Figure 1B:
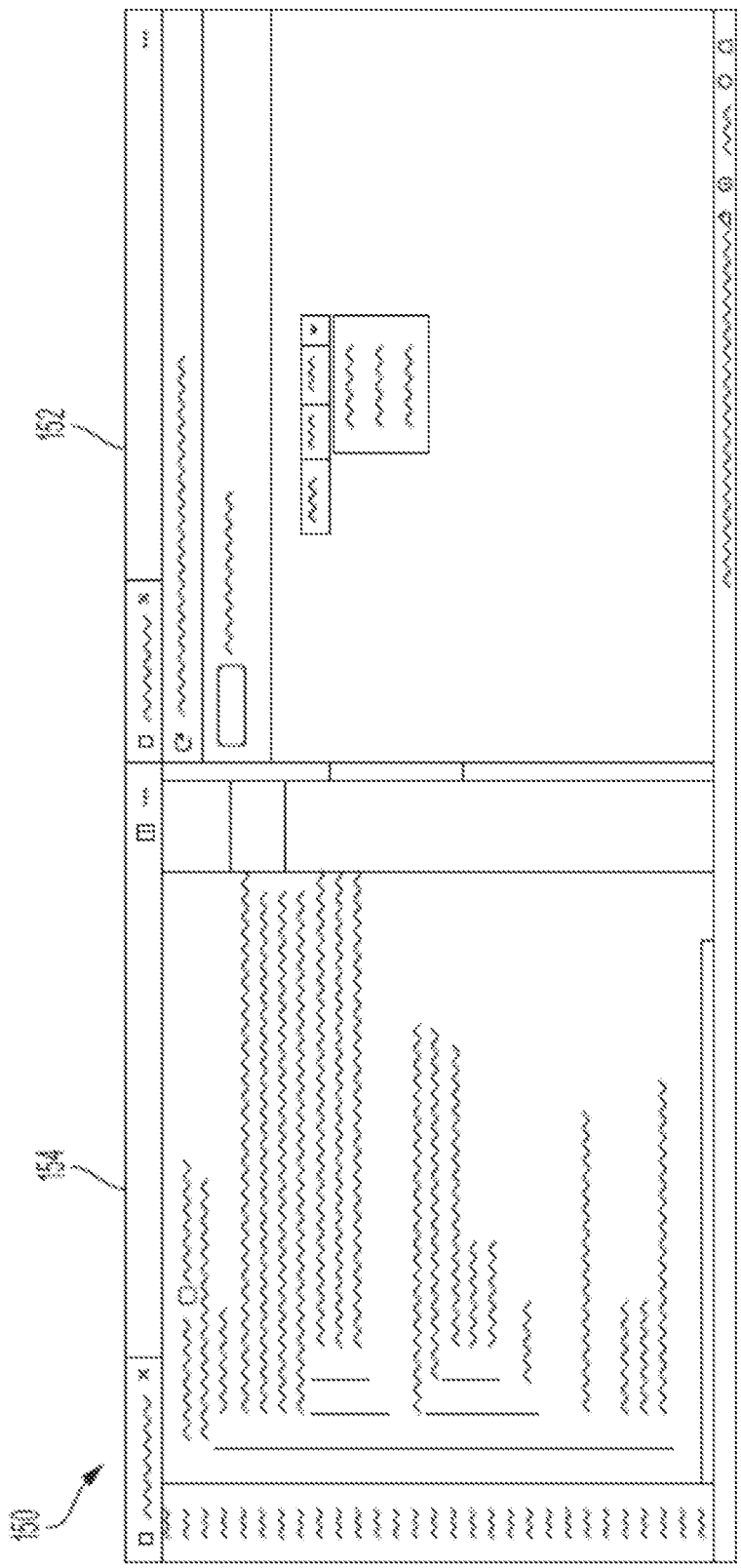
FIG. 1b is a display image of a system for conducting UI software component testing in accordance with one embodiment.

Turning now to FIG. 1b, a display image 150 of a system for coding UI software component testing is shown in accordance with one embodiment. In this display, the browser webview 152 is shown simultaneously displayed with the code editor 154. In this embodiment, the browser webview 152 and the code editor 154 are shown with a dual screen cast window that is shown during the UI software component testing. As previously mentioned, the webview 152 displays a screencast from the headless browser while the code editor 154 is an inline code editor in the embodiment shown.

Figure 2:
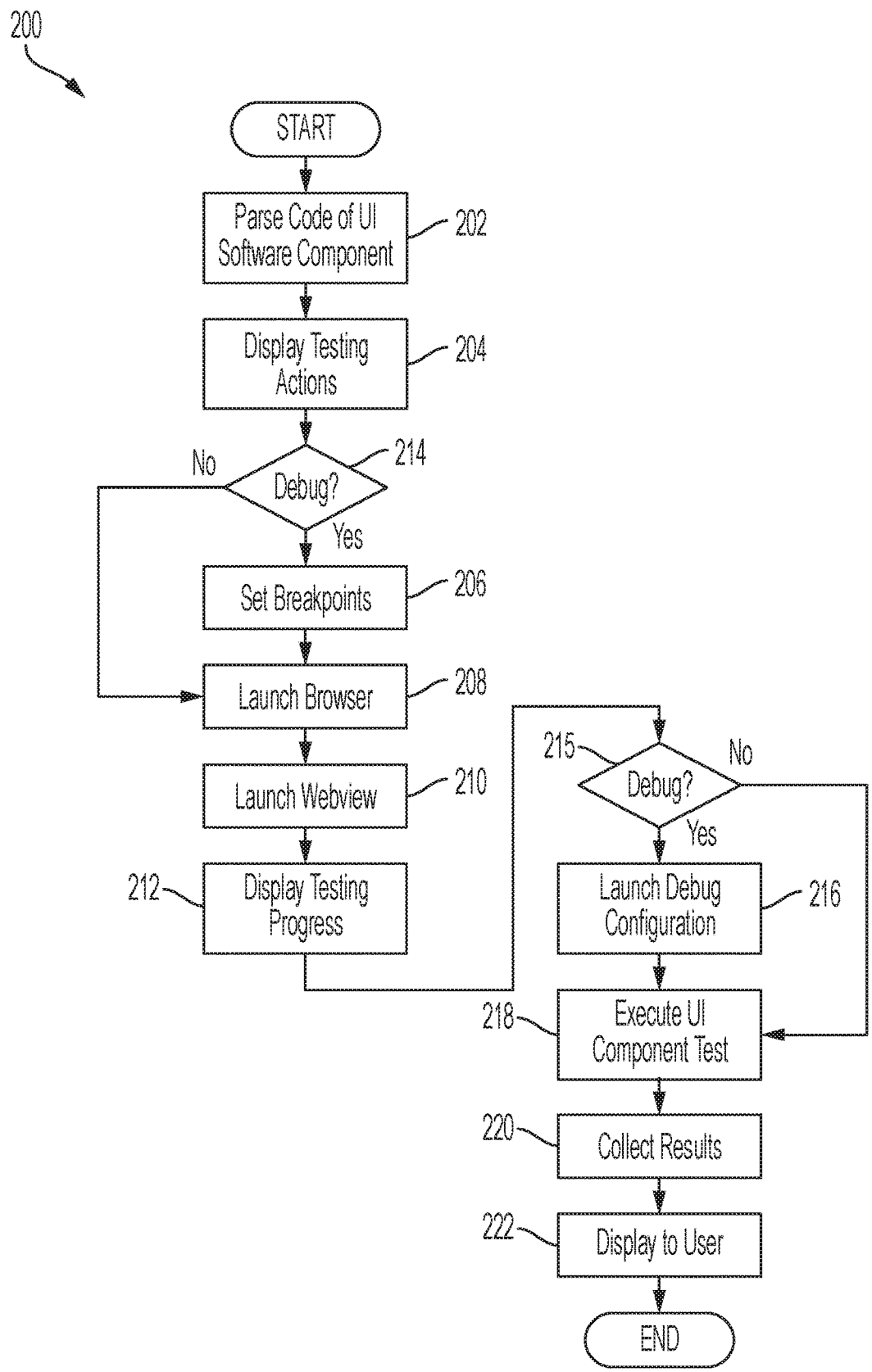
FIG. 2 is a flow chart of a method for conducting UI software component testing in accordance with one embodiment.

Turning now to FIG. 2, a flowchart 200 is shown of a method for conducting UI software component testing in accordance with one embodiment. First, the code of the UI software component test file is parsed to generate test information at test locations located in the code 202. Testing actions are then displayed with a code editor 204. If a bug is detected 214, testing breakpoints are set at various locations in the code of the test file of the UI software component 206. If a bug is not detected, Then the browser is launched 208 (for both cases where a bug is detected and not detected). However if a bug is detected, the browser should be launched 208 with a debugging port. In some embodiments, the debugging port may be remotely located. A webview is launched with the code editor 210. Testing progress of the UI software component is displayed to a user with a screen cast from the browser of the webview 212. If a bug is detected at this point 215, a debug configuration is launched with the code editor and attach to the debugging port of the browser 216. If a bug is not detected, the UI component test is immediately launched 218. In one type of UI component test, the browser navigates to a test uniform resource locator (URL) based on the parsed test information. In an alternative embodiment, the UI component test simply executes a set of test instructions. The browser then collects the test results 220 and the test results are presented to the user by the code editor 222.

It would be advantageous to analyze the images posted across a data group to identify points of interest and detect positive usage trends across groups. Embodiments of the subject matter described herein generally relate to techniques for processing and analysis of posted online images. More particularly, embodiments of the subject matter relate to identifying positive usage trends based on analysis of posted online images. The disclosed embodiments described below may be implemented in a wide variety of different computer-based systems, architectures and platforms which may include a multi-tenant system. Additionally, the disclosed embodiments may be implemented using mobile devices, smart wearable devices, virtual systems, etc.

Figure 3:
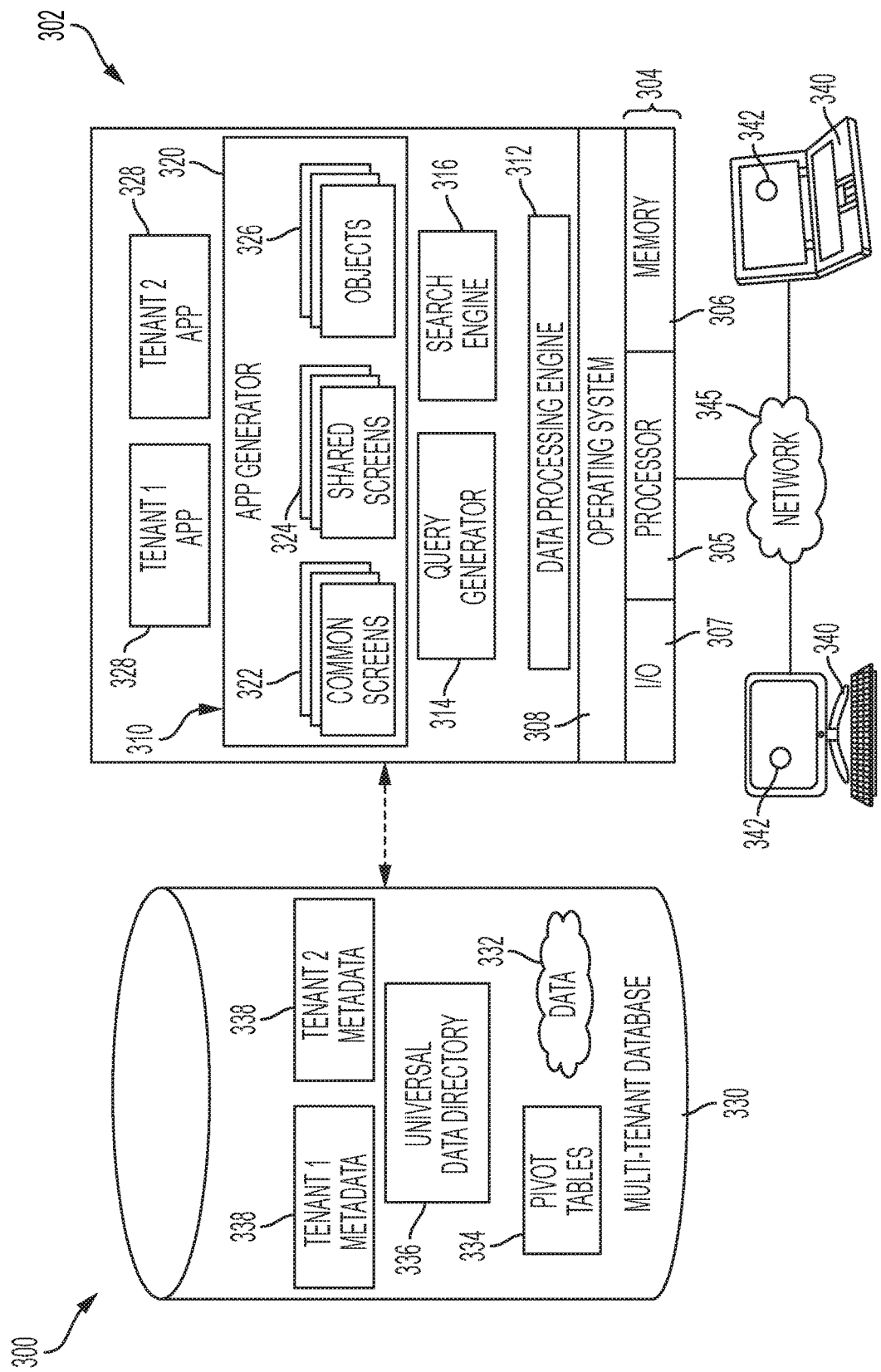
FIG. 3 is a schematic block diagram of an exemplary multi-tenant computing environment.

Turning now to FIG. 3, an exemplary multi-tenant system 300 includes a server 302 that dynamically creates and supports virtual applications 328 based upon data 332 from a database 330 that may be shared between multiple tenants, referred to herein as a multi-tenant database. Data and services generated by the virtual applications 328 are provided via a network 345 to any number of client devices 340, as desired. Each virtual application 328 is suitably generated at run-time (or on-demand) using a common application platform 310 that securely provides access to the data 332 in the database 330 for each of the various tenants subscribing to the multi-tenant system 300. In accordance with one non-limiting example, the multi-tenant system 300 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 330. In this regard, each tenant includes one or more users associated with, assigned to, or otherwise belonging to that respective tenant. Stated another way, each respective user within the multi-tenant system 300 is associated with, assigned to, or otherwise belongs to a particular one of the plurality of tenants supported by the multi-tenant system 300. Tenants may represent companies, corporate departments, business or legal organizations, and/or any other entities that maintain data for particular sets of users (such as their respective customers) within the multi-tenant system 300. Although multiple tenants may share access to the server 302 and the database 330, the particular data and services provided from the server 302 to each tenant can be securely isolated from those provided to other tenants. The multi-tenant architecture therefore allows different sets of users to share functionality and hardware resources without necessarily sharing any of the data 332 belonging to or otherwise associated with other tenants.

The multi-tenant database 330 may be a repository or other data storage system capable of storing and managing the data 332 associated with any number of tenants. The database 330 may be implemented using conventional database server hardware. In various embodiments, the database 330 shares processing hardware 304 with the server 302. In other embodiments, the database 330 is implemented using separate physical and/or virtual database server hardware that communicates with the server 302 to perform the various functions described herein. In an exemplary embodiment, the database 330 includes a database management system or other equivalent software capable of determining an optimal query plan for retrieving and providing a particular subset of the data 332 to an instance of virtual application 328 in response to a query initiated or otherwise provided by a virtual application 328, as described in greater detail below. The multi-tenant database 330 may alternatively be referred to herein as an on-demand database, in that the multi-tenant database 330 provides (or is available to provide) data at run-time to on-demand virtual applications 328 generated by the application platform 310, as described in greater detail below.

In practice, the data 332 may be organized and formatted in any manner to support the application platform 310. In various embodiments, the data 332 is suitably organized into a relatively small number of large data tables to maintain a semi-amorphous "heap"-type format. The data 332 can then be organized as needed for a particular virtual application 328. In various embodiments, conventional data relationships are established using any number of pivot tables 334 that establish indexing, uniqueness, relationships between entities, and/or other aspects of conventional database organization as desired. Further data manipulation and report formatting is generally performed at run-time using a variety of metadata constructs. Metadata within a universal data directory (UDD) 336, for example, can be used to describe any number of forms, reports, workflows, user access privileges, business logic and other constructs that are common to multiple tenants. Tenant-specific formatting, functions and other constructs may be maintained as tenant-specific metadata 338 for each tenant, as desired. Rather than forcing the data 332 into an inflexible global structure that is common to all tenants and applications, the database 330 is organized to be relatively amorphous, with the pivot tables 334 and the metadata 338 providing additional structure on an as-needed basis. To that end, the application platform 310 suitably uses the pivot tables 334 and/or the metadata 338 to generate "virtual" components of the virtual applications 328 to logically obtain, process, and present the relatively amorphous data 332 from the database 330.

The server 302 may be implemented using one or more actual and/or virtual computing systems that collectively provide the dynamic application platform 310 for generating the virtual applications 328. For example, the server 302 may be implemented using a cluster of actual and/or virtual servers operating in conjunction with each other, typically in association with conventional network communications, cluster management, load balancing and other features as appropriate. The server 302 operates with any sort of conventional processing hardware 304, such as a processor 305, memory 306, input/output features 307 and the like. The input/output features 307 generally represent the interface(s) to networks (e.g., to the network 345, or any other local area, wide area or other network), mass storage, display devices, data entry devices and/or the like. The processor 305 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 306 represents any non-transitory short or long term storage or other computer-readable media capable of storing programming instructions for execution on the processor 305, including any sort of random access memory (RAM), read only memory (ROM), flash memory, magnetic or optical mass storage, and/or the like. The computer-executable programming instructions, when read and executed by the server 302 and/or processor 305, cause the server 302 and/or processor 305 to create, generate, or otherwise facilitate the application platform 310 and/or virtual applications 328 and perform one or more additional tasks, operations, functions, and/or processes described herein. It should be noted that the memory 306 represents one suitable implementation of such computer-readable media, and alternatively or additionally, the server 302 could receive and cooperate with external computer-readable media that is realized as a portable or mobile component or platform, e.g., a portable hard drive, a USB flash drive, an optical disc, or the like.

The application platform 310 is any sort of software application or other data processing engine that generates the virtual applications 328 that provide data and/or services to the client devices 340. In a typical embodiment, the application platform 310 gains access to processing resources, communications interfaces and other features of the processing hardware 304 using any sort of conventional or proprietary operating system 308. The virtual applications 328 are typically generated at run-time in response to input received from the client devices 340. For the illustrated embodiment, the application platform 310 includes a bulk data processing engine 312, a query generator 314, a search engine 316 that provides text indexing and other search functionality, and a runtime application generator 320. Each of these features may be implemented as a separate process or other module, and many equivalent embodiments could include different and/or additional features, components or other modules as desired.

The runtime application generator 320 dynamically builds and executes the virtual applications 328 in response to specific requests received from the client devices 340. The virtual applications 328 are typically constructed in accordance with the tenant-specific metadata 338, which describes the particular tables, reports, interfaces and/or other features of the particular application 328. In various embodiments, each virtual application 328 generates dynamic web content that can be served to a browser or other client program 342 associated with its client device 340, as appropriate.

The runtime application generator 320 suitably interacts with the query generator 314 to efficiently obtain multi-tenant data 332 from the database 330 as needed in response to input queries initiated or otherwise provided by users of the client devices 340. In a typical embodiment, the query generator 314 considers the identity of the user requesting a particular function (along with the user's associated tenant), and then builds and executes queries to the database 330 using system-wide metadata 336, tenant specific metadata 338, pivot tables 334, and/or any other available resources. The query generator 314 in this example therefore maintains security of the common database 330 by ensuring that queries are consistent with access privileges granted to the user and/or tenant that initiated the request.

With continued reference to FIG. 3, the data processing engine 312 performs bulk processing operations on the data 332 such as uploads or downloads, updates, online transaction processing, and/or the like. In many embodiments, less urgent bulk processing of the data 332 can be scheduled to occur as processing resources become available, thereby giving priority to more urgent data processing by the query generator 314, the search engine 316, the virtual applications 328, etc.

In exemplary embodiments, the application platform 310 is utilized to create and/or generate data-driven virtual applications 328 for the tenants that they support. Such virtual applications 328 may make use of interface features such as custom (or tenant-specific) screens 324, standard (or universal) screens 322 or the like. Any number of custom and/or standard objects 326 may also be available for integration into tenant-developed virtual applications 328. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 332 associated with each virtual application 328 is provided to the database 330, as appropriate, and stored until it is requested or is otherwise needed, along with the metadata 338 that describes the particular features (e.g., reports, tables, functions, objects, fields, formulas, code, etc.) of that particular virtual application 328. For example, a virtual application 328 may include a number of objects 326 accessible to a tenant, wherein for each object 326 accessible to the tenant, information pertaining to its object type along with values for various fields associated with that respective object type are maintained as metadata 338 in the database 330. In this regard, the object type defines the structure (e.g., the formatting, functions and other constructs) of each respective object 326 and the various fields associated therewith.

Still referring to FIG. 3, the data and services provided by the server 302 can be retrieved using any sort of personal computer, mobile telephone, tablet or other network-enabled client device 340 on the network 345. In an exemplary embodiment, the client device 340 includes a display device, such as a monitor, screen, or another conventional electronic display capable of graphically presenting data and/or information retrieved from the multi-tenant database 330, as described in greater detail below. Typically, the user operates a conventional browser application or other client program 342 executed by the client device 340 to contact the server 302 via the network 345 using a networking protocol, such as the hypertext transport protocol (HTTP) or the like. The user typically authenticates his or her identity to the server 302 to obtain a session identifier ("SessionID") that identifies the user in subsequent communications with the server 302. When the identified user requests access to a virtual application 328, the runtime application generator 320 suitably creates the application at run time based upon the metadata 338, as appropriate. As noted above, the virtual application 328 may contain Java, ActiveX, or other content that can be presented using conventional client software running on the client device 340; other embodiments may simply provide dynamic web or other content that can be presented and viewed by the user, as desired. As described in greater detail below, the query generator 314 suitably obtains the requested subsets of data 332 from the database 330 as needed to populate the tables, reports or other features of the particular virtual application 328.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"— The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with the process may be performed by software, hardware, firmware, or any combination thereof. For illustrative purposes, the description of the process may refer to elements mentioned above. In practice, portions of the process may be performed by different elements of the described system, e.g., component A, component B, or component C. It should be appreciated that process may include any number of additional or alternative tasks, the tasks shown need not be performed in the illustrated order, and the process may be incorporated into a more comprehensive procedure or process having additional functionality not described in detail herein. Moreover, one or more of the tasks could be omitted from an embodiment of the process as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for conducting user interface (UI) software component testing, the system comprising:
   a processor;
   a memory;
   a browser for use in testing a UI software component, where the test of the UI software component is initiated and a display of test results are shown to a user in the browser;
   a code editor for debugging by the user, where the code editor receives the test results from the browser and presents the test results to the user for debugging;
   a code editor extension which parses code of the UI software component and obtains information necessary for test execution comprising, test uniform resource locator (URL) files, test names, and test locations located within the code of the UI software component;

where the browser and the code editor are simultaneously and continuously displayed side by side to the user in a dual screencast window during the UI software testing;

where the code editor initiates debugging while simultaneously referencing the test results shown in the browser, and where the browser is a headless browser, where the code editor is an inline code editor;

where the code editor utilizes an application programming interface (API) and where the API is extensible.

2. The system of claim 1, where the browser is launched through a debugging port.

3. The system of claim 2, where the debugging port is remotely located.

4. The system of claim 1, where the code editor launches a webview prior to testing the UI software component.

5. The system of claim 4, where the browser screencasts the webview of the copy editor for the user.

6. The system of claim 4, where the webview shows testing actions for the UI software component.

7. The system of claim 4, where the webview shows testing progress for the UI software component.

8. The system of claim 4, where the webview shows the testing results at the testing break points for the UI software component.

9. A computer-implemented method for conducting user interface (UI) software component testing, the method comprising:

launching a code editor extension which parses code of the UI software component and obtains information necessary for test execution comprising, test uniform resource locator (URL) files, test names, and test locations located within the code of the UI software component;

displaying testing actions with a screencast from the code editor;

setting testing breakpoints at various locations in the code of the UI software component;

launching a browser with a debugging port;

launching a webview with the code editor;

displaying UI software component testing progress to a user with a screencast from the browser of the webview, where the browser and the code editor are simultaneously and continuously displayed side by side to the user in a dual screencast window during the UI software component testing;

launching a debug configuration with the code editor with the test information and attaching to the debugging port of the browser;

navigating to a test uniform resource locater (URL) with the browser from parsed test information;

collecting test results with the browser;

presenting the test results in the code editor to the user; and initiating debugging with the code editor while simultaneously referencing the test results shown in the browser, where the browser is a headless browser, where the code editor is an inline code editor, and where the code editor utilizes an extensible application programming interface (API).

10. The method of claim 9, where the debugging port is remotely located.

11. The method of claim 9, where the webview shows the testing results at the testing breakpoints for the UI software component.

* * * * *